United States Patent [19]
Petter et al.

[11] Patent Number: 6,021,792
[45] Date of Patent: Feb. 8, 2000

[54] MODULAR CLEANING FACILITY

[76] Inventors: Matthew J. Petter, 301 Union St., Douglas, Mich. 49406; Douglas A. Petter, 326 Michigan St., South Haven, Mich. 49090

[21] Appl. No.: 08/927,854

[22] Filed: Sep. 11, 1997

[51] Int. Cl.$^7$ .................................................... B08B 3/04
[52] U.S. Cl. .................... 134/111; 134/104.2; 134/104.3; 134/109
[58] Field of Search .............................. 134/104.2, 104.3, 134/104.4, 123, 109, 111, 102.1, 102.2, 108; 210/163, 164, 167, 474, 406, 416.1, 416.4; 211/127.1, 153, 181.1, 175

[56] References Cited

U.S. PATENT DOCUMENTS

| | | | |
|---|---|---|---|
| 1,146,845 | 7/1915 | Burham | 134/104.2 |
| 1,863,914 | 6/1932 | Tyler | 211/127.1 |
| 3,101,148 | 8/1963 | Brown | 211/181.1 |
| 3,784,044 | 1/1974 | Bruggeman et al. | 220/19 |
| 3,970,556 | 7/1976 | Gore | 210/83 |
| 3,996,136 | 12/1976 | Jakubek et al. | 210/88 |
| 4,135,533 | 1/1979 | Gall et al. | 134/104 |
| 4,652,368 | 3/1987 | Ennis et al. | 210/97 |
| 4,930,632 | 6/1990 | Eckert et al. | 206/386 |
| 5,036,976 | 8/1991 | Sechler et al. | 206/386 |
| 5,150,727 | 9/1992 | D'Amato | 134/104.2 |
| 5,186,758 | 2/1993 | Hartman | 134/10 |
| 5,207,922 | 5/1993 | McFarlan et al. | 210/708 |
| 5,265,630 | 11/1993 | Hartmann | 134/95.1 |
| 5,374,352 | 12/1994 | Pattee | 210/104 |
| 5,458,299 | 10/1995 | Collins et al. | 244/134 C |
| 5,462,655 | 10/1995 | Ladd et al. | 210/167 |
| 5,498,329 | 3/1996 | Lamminen et al. | 210/86 |
| 5,556,535 | 9/1996 | Van Der Est | 210/140 |
| 5,560,782 | 10/1996 | Latimer | 134/10 |
| 5,590,671 | 1/1997 | Yachera | 134/95.1 |
| 5,595,308 | 1/1997 | King et al. | 211/40 |
| 5,597,001 | 1/1997 | Rasmussen et al. | 134/104.2 |
| 5,647,977 | 7/1997 | Arnaud | 210/167 |
| 5,673,715 | 10/1997 | Carter | 134/104.4 |
| 5,785,067 | 7/1998 | Kosofsky | 134/102.1 |

FOREIGN PATENT DOCUMENTS 9701399  1/1997  WIPO .

OTHER PUBLICATIONS

Internet Web Pages, http://www.pressureisland.com/6× 6.htm and http://www.pressureisland.com/6×12.htm, Sep. 4, 1998.
Pressure Island Brochure, Oct. 1996.
Environmental Products, Inc. Rinsate Pad® brochure distributed prior to Sep. 1997.
EZ Environmental Solutions Co. Pressure Island™ brochure distributed prior to Sep. 1997.

*Primary Examiner*—Randy Gulakowski
*Assistant Examiner*—Paul J. Lee
*Attorney, Agent, or Firm*—Price, Heneveld, Cooper, DeWitt & Litton

[57] ABSTRACT

A modular cleaning system is provided generally comprising at least one modular wash rack having a drainage fitting and a coupling means to allow one modular wash rack to be fastened to another modular wash rack, a tube connected to the drainage fitting, and a filtering system generally comprising a vacuum pump for pumping a liquid through the tube from the drainage fitting to the filtering system, and at least one filter, the filter being operably associated with the vacuum pump. Also provided is a method for recycling a liquid waste product including the steps of washing an item with a liquid using a nozzle to spray the item, providing at least one wash rack for the waste product to drip into, pumping the waste product from the wash rack to a filtering system, skimming oil from the waste product, forcing the waste product through a weir system to eliminate large particles, filtering the waste product to provide a recycled liquid, and using a pressure washer to return the recycled liquid to the nozzle for further washing.

16 Claims, 4 Drawing Sheets

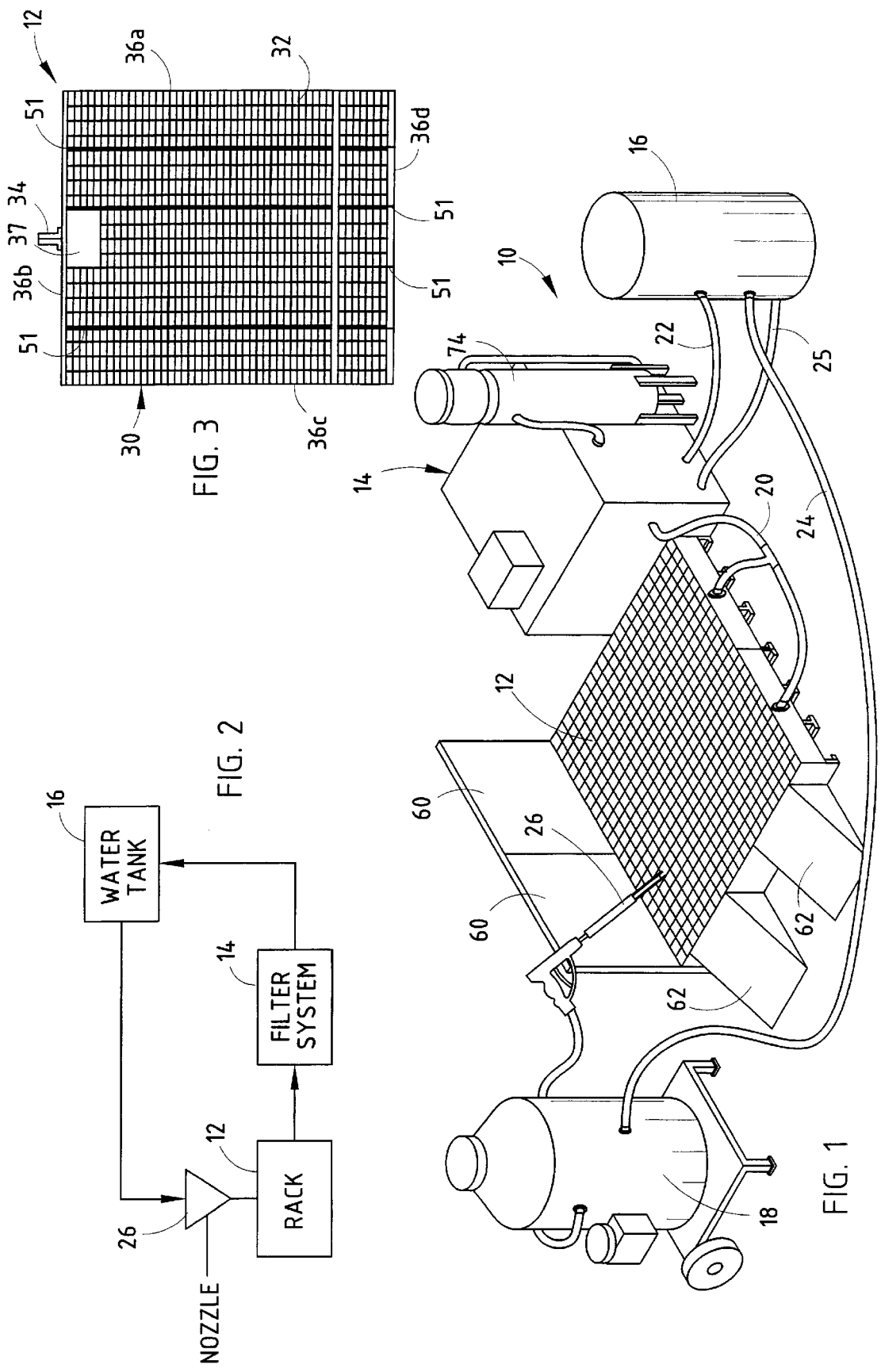

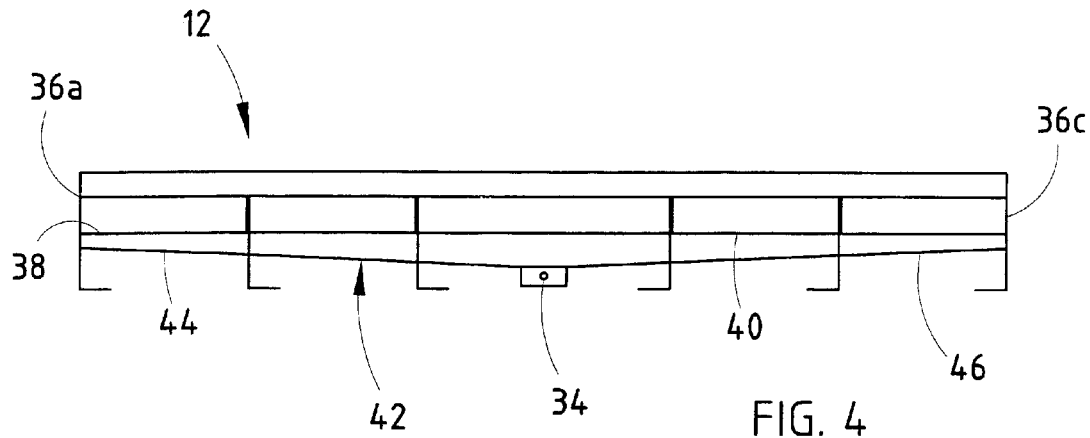
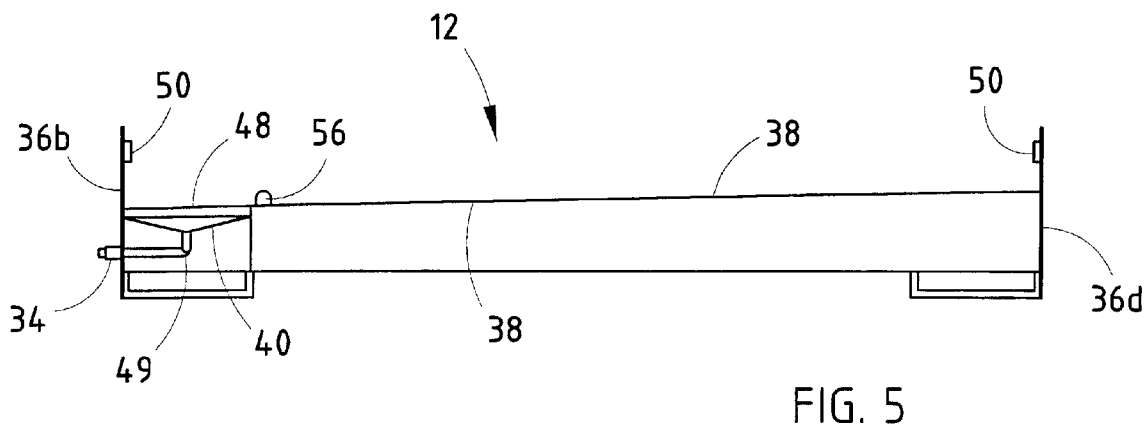
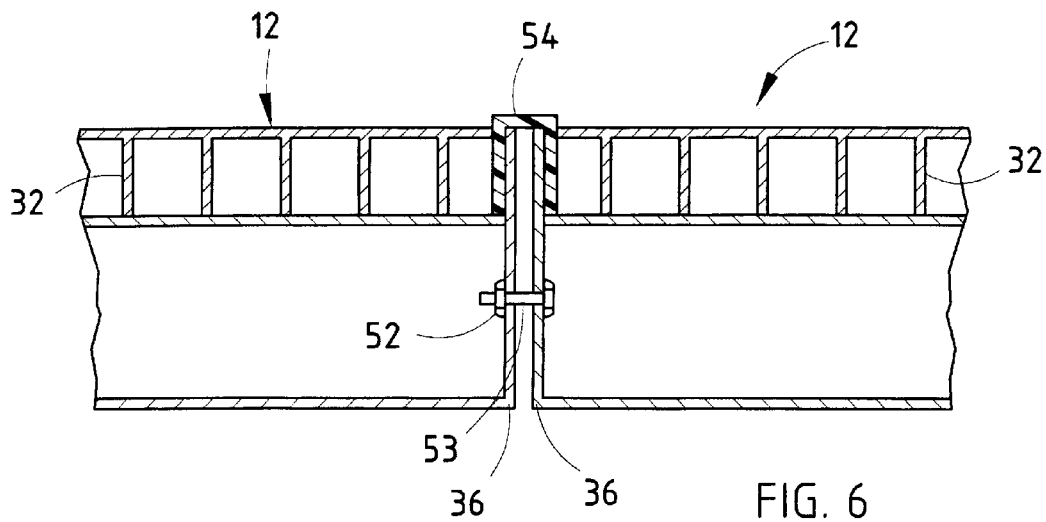

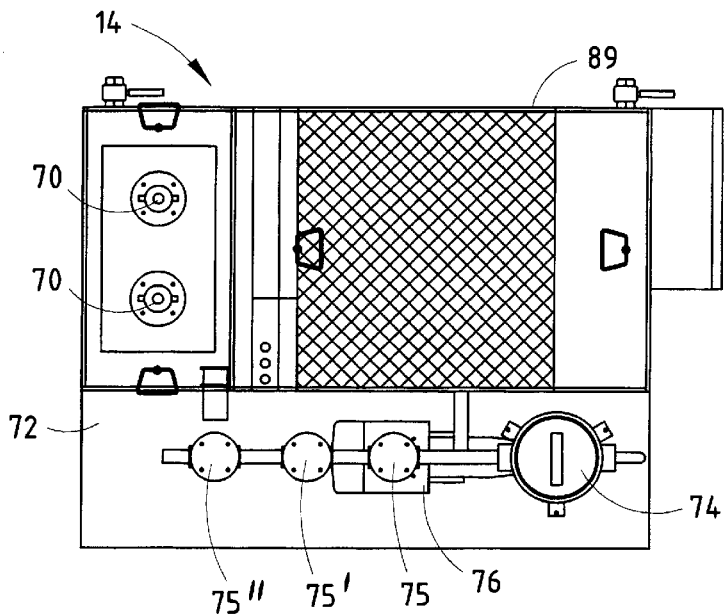
FIG. 7
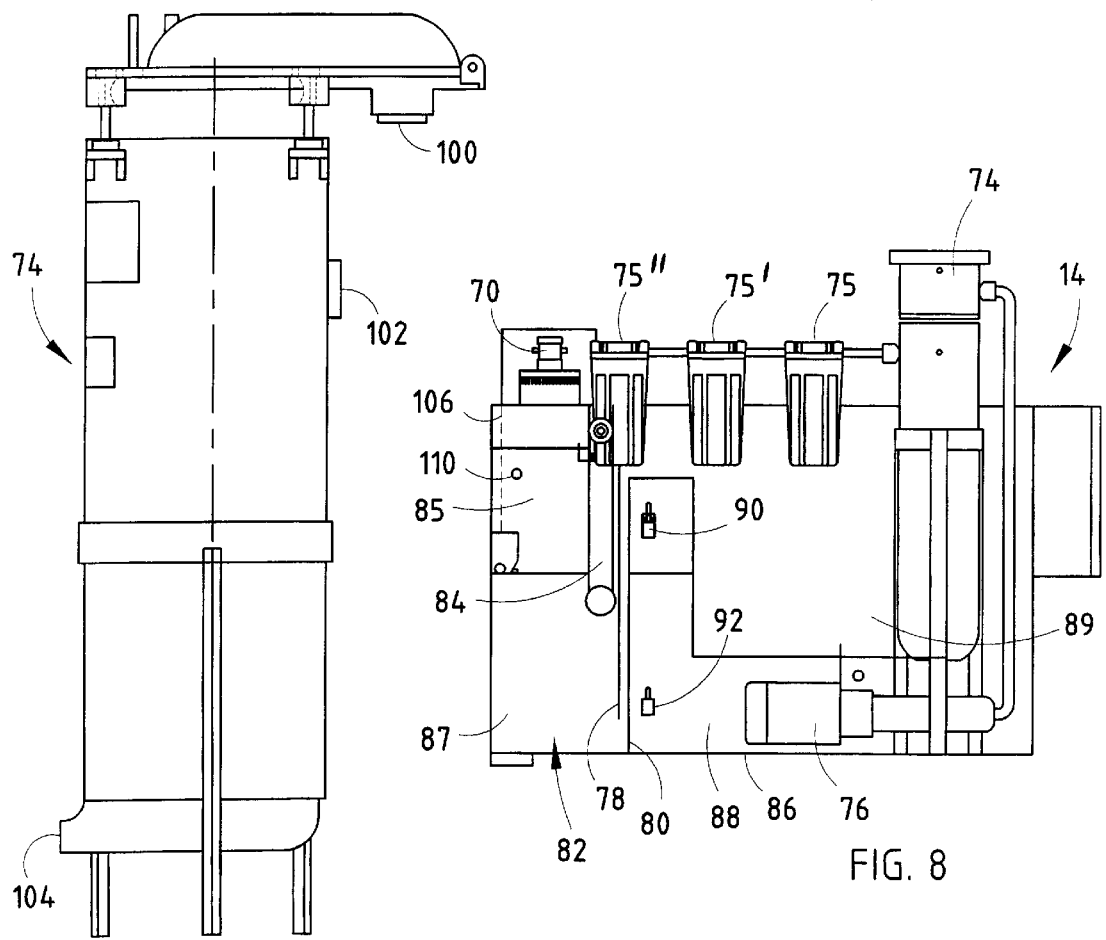
FIG. 9
FIG. 8

MODULAR CLEANING FACILITY

BACKGROUND OF THE INVENTION

The present invention relates to a modular recycling wash rack system.

In the past, washing vehicles, engine parts, lawn mowers and the like, while recycling the waste product, involved one of two options. The first, an in-ground sump, is very expensive to use, is not portable, and provides no flexibility for expansion or reduction in size. The in-ground sump requires sophisticated monitoring and maintenance, and requires a separate filtration system. Such an option is not practical or efficient for most cleaning needs.

The second, a mat and vacuum boom, is easily punctured and requires a smooth prepared surface, preferably with sloping. Such a system is slippery when wet and treacherous when oily or soapy. Furthermore, a mat and vacuum boom requires a separate filtration system. Accordingly, it is desired in industry to have a modular, semi-permanent recycling wash system that is inexpensive, can vary in size, and can be used on any surface and at different slopes.

SUMMARY OF THE INVENTION

One aspect of the present invention is a modular wash rack comprising a frame with four walls and a sloped tray, a drainage fitting on the outside of one of the walls, a trough adjacent to the wall with the drainage fitting, the trough having a bottom sloping downward toward the drainage fitting, the sloped tray having its highest point at the wall opposite the wall with the drainage fitting and terminating at its lowest point at the trough, and a grate positioned over the sloped tray and trough.

Another aspect of the present invention is a modular cleaning system generally comprising at least one modular wash rack having a drainage fitting and a coupling means to allow one modular wash rack to be fastened to another, a tube connected to the drainage fitting, and a filtering system generally comprising a vacuum pump for pumping a liquid through the tube from the drainage fitting to the filtering system and at least one filter, preferably at least four filters, the filter being operably associated with the vacuum pump.

Still another aspect of the present invention is a filtering system comprising a vacuum pump adapted to pump liquid from an outside source to the filtering system, a separation chamber downstream from a vacuum pump, an oil skimmer downstream from the vacuum pump and integral with the separation chamber, a bag filter downstream from the separation chamber and oil skimmer, and a series of micron cartridge filters downstream from the bag filter.

These and other features, advantages and objects of the present invention will be further understood and appreciated by those skilled in the art by reference to the following specification, claims and appended drawings.

BRIEF DESCRIPTION OF THE DRAWINGS

FIG. 1 is a perspective view of a modular cleaning system embodying the present invention;

FIG. 2 is a flow chart of a modular cleaning system of the present invention;

FIG. 3 is a plan view of a modular wash rack of the present invention;

FIG. 4 is a front elevational view of a modular wash rack of the present invention;

FIG. 5 is a side elevational view of a modular wash rack of the present invention;

FIG. 6 is a partial cross-sectional view of two modular wash racks of the present invention;

FIG. 7 is a plan view of a filtering system of the present invention;

FIG. 8 is an elevational view of a filtering system of the present invention with its cover off;

FIG. 9 is an elevational view of a bag filter to be used with the present invention.

DETAILED DESCRIPTION OF PREFERRED EMBODIMENT

Figure 10:
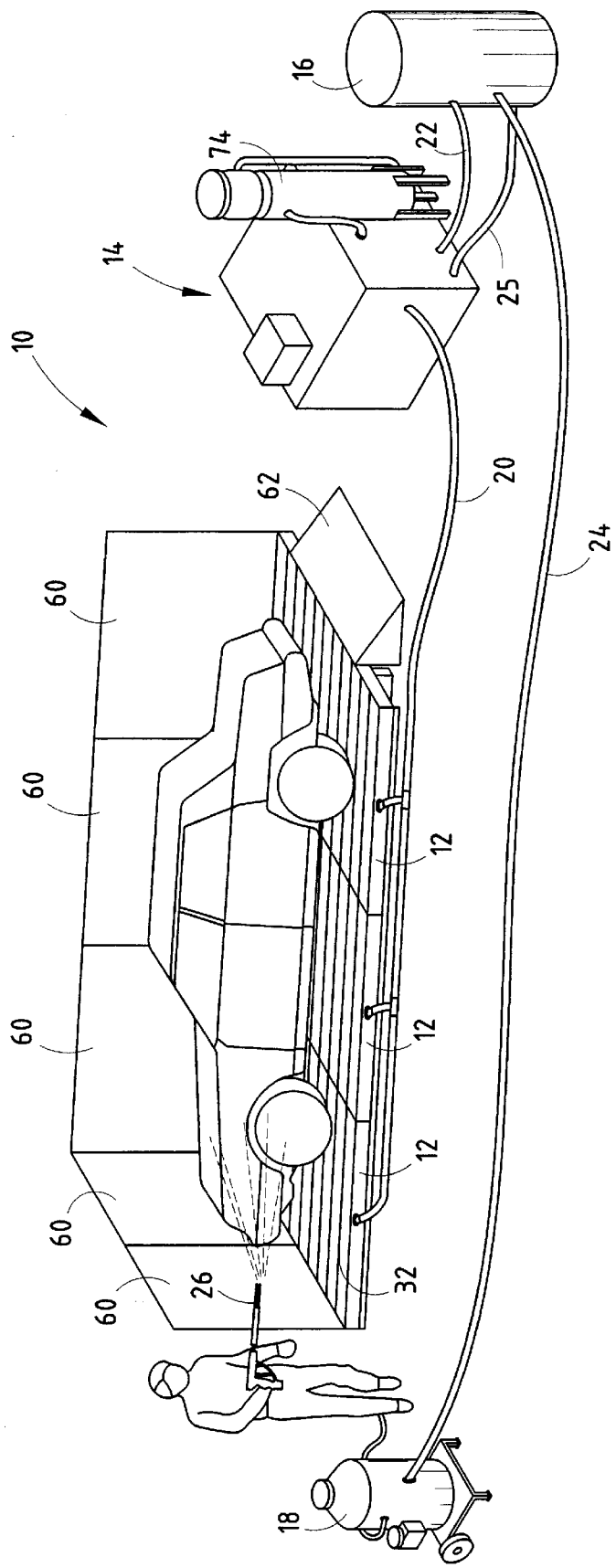
FIG. 10 is a perspective view of a modular cleaning system of the present invention in use.

The present invention is a modular cleaning system 10 which generally includes one or more modular wash racks 12, a filtering system 14, a fresh water tank 16, and a pressure washer 18, as shown in FIG. 1. The wash racks 12 are connected to the filtering system 14 by a hose 20, which is preferably plastic smoothwall tubing. A second hose 22 connects the filtering system 14 to the fresh water tank 16 and a third hose 24 connects fresh water tank 16 to pressure washer 18. A fourth hose 25 is also connected between the fresh water tank 16 and the filtering system 14 for recycling liquid back through the filtering system. The fresh water tank 16 is preferably elevated for drainage back to the filtering system 14 for recycling when a certain level of liquid is reached.

FIG. 2 shows the basic components of the present invention and shows the general flow of liquid through the cleaning system. Water is discharged from a nozzle 26 to clean a dirty item sitting on rack 12. The liquid from the rack is then transported to the filtering system 14, from the filtering system 14 to water tank 16, and back eventually to the nozzle 26, completing a closed loop.

FIG. 3 shows a single modular wash rack 12, which generally includes a frame 30, a grate 32, and a drainage fitting 34. Frame 30 includes walls 36, shown individually as 36a, 36b, 36c, and 36d. Preferably, all parts of the modular wash rack are made of steel, so that parts and vehicles that weigh as much as 10,000 pounds may be positioned on the wash rack. The modular wash rack 12 preferably has an area of 6 feet by 6 feet. Grate 32 is made of three segments, each two feet by six feet, and has openings of approximately one inch by three inches, to offer sufficient drainage of the waste liquid from cleaning the dirty item. Grate 32 also includes an access panel 37 for easy access to drainage fitting 34 and the inners of modular wash rack 12 in case of blockage or for general cleaning.

As seen in FIG. 4, the modular wash rack 12 includes a bottom tray 38. Bottom tray 38 has a trough 40 with a trough bottom 42 that is sloped downward toward drainage fitting 34. Preferably, trough bottom 42 has a first channel 44 that slopes downward from wall 36a and a second channel 46 that slopes downward from wall 36c toward the center of wall 36b where drainage fitting 34 is located. Also, as seen in FIG. 5, bottom tray 38 has its highest point along wall 36d. The bottom tray 38 slopes downward toward trough 40 and wall 36b and terminates at trough 40, thus allowing liquid to flow into trough 40 due to gravity forces. The sloping feature allows the modular wash racks 12 to be placed on a non-level surface, which permits various outdoor and indoor uses. As shown in FIG. 5, trough 40 has over it a drainage plate 48 that has circular openings to allow the liquid and particles to flow through to the trough 40. Once the liquid makes it to trough 40, the liquid then moves downwardly and centrally toward drainage fitting 34. Upon reaching the center of the trough 40, the liquid with the particles falls through a hole in the trough to a screen 49 similar to a screen for a bathtub drain. Once through the screen, the liquid flows through a hole in wall 36b and to drainage fitting 34. Drainage fitting 34 should have a properly sized hole to ensure the greatest efficiency. If the hole has too large of a diameter, the vacuum pumps pull on too much air, which is undesirable. If the hole has too small of a diameter, too low of a velocity of the liquid will result. A preferable size hole for using six or fewer racks is one-half inch diameter. To ensure maximum efficiency, the plastic tubing should be oversized, preferably with an inside diameter of 1¼ inches.

FIG. 5 also shows grate supports 50 on the inner side of walls 36. The grate supports 50 are preferably located on the inside of each wall 36 to give the maximum support for the grate 32. Grate 32 is simply placed on grate supports 50, which are positioned so that the top of grate 32 will be flush with the top of walls 36. The grates are also supported by support members 51. The support members 51 extend the entire length of the modular wash rack 12 from wall 36b to 36d and are spaced fifteen inches from each other. Because the support members 51 are positioned in the same direction as the fluid flow, the liquid is not impeded by the support members 51, but instead the members channel the liquid to the trough 40. The rack further includes a grass catching wall 56.

FIG. 6 shows two modular wash racks 12 that are connected. The modular wash racks 12 each have an orifice 53 in at least one wall 36. Orifice 53 is positioned so that it aligns with an orifice of an adjoining wash rack 12. The aligned orifices 53 allow the modular wash racks 12 to be coupled to each other, while keeping their walls 36 aligned. A fastener 52, such as a nut and bolt, can be used to couple two modular wash racks to each other. This connection ability allows great size variance from a 6-foot-by-6-foot system up to as big of wash rack system size as desired. Furthermore, the wash rack system surface need not be square, but its length any multiple of 6 feet and its width any length of 6 feet. A molded cover 54, preferably made of rubber, is placed over the lips of each of the grates 32 to prevent liquid from escaping the closed loop system by flowing between the walls 36 of the modular wash racks 12.

The wash rack, as shown in FIG. 1, may also have attached to it splash walls 60 for helping contain the liquid to the wash rack area. Splash walls 60 are preferably either two feet tall or four feet tall and are made of rigid steel with a quarter-inch Lean™ panel. The wash rack 12 includes two detachable ramps 62 to be used to assist driving a vehicle onto the wash rack 12. Each ramp 62 is three feet by four feet.

FIG. 7 shows a preferred embodiment of the filtering system 14. Filtering system 14 generally includes two vacuum pumps 70, a tank 72, a bag filter 74, three micron cartridge filters 75, 75', and 75", and a pump 76. As seen in FIG. 8, the filtering system also includes a first weir 78 and a second weir 80, creating a separation chamber 82, and an oil skimmer 84. Additional components, such as a reverse osmosis filter, carbon columns, flocculent injectors, ozone generators, and dryers can also be, and preferably are, added to the filtering system. The first weir 78 extends from the top of tank 72 to within one inch of the bottom 86 of the tank. The first weir 78 traps oils. The second weir 80 is a cascading wall that extends 18 inches upward from the bottom 86. Second weir 80 is located one inch from first weir 78. Oil removed by oil skimmer 84 is contained in a separate internal reservoir 85 and valved to the outside for easy discarding by an oil drain 110.

During operation, heavy particulate matter will settle to the bottom of a first chamber portion 87 of the separation chamber 82 for periodic removal. This feature greatly increases filter life. In a second chamber portion 88 of the separation chamber 82, a bulk media basket 89 is used to further purify the liquid and to collect oil. Additional settling of suspended particles occurs in the second chamber portion 88. None of the liquid will be pumped from the second chamber portion 88 of the separation chamber 82 in less than seven minutes from the time the liquid enters the second chamber portion 88. Filtering system 14 also contains a high-level float switch 90 that is activated when the liquid reaches a preset level in the second chamber portion 88. Once activated, the high-level float switch 90 switches on pump 76 which pumps a set amount of the liquid through the filters and to the fresh water tank 16, such as 60 gallons of the 110 gallons needed to trigger the high-level float switch 90. The filtering system 14 also contains a low-level float switch 92 that shuts the pump down completely when the water level gets too low, which is normally at a depth of eight inches or roughly 50 gallons. There is also a second high-level switch (not shown) that interrupts all power if the liquid rises to dangerous overflow levels.

Pump 76 is preferably a multi-stage 115V continuous duty unit with high tolerance for entrained air and solids loading. The pump 76 must also have sufficient reserve capacity to ensure complete utilization of the filters. The pump 76 will maintain eight gallons per minute of fluid flow at 125 psi.

The bag filter 74 is a standard bag filter used in industry, such as one made by 3M that is a 20 micron high loading oil adsorbing filter. Preferably, the bag filter housing is a non-bypass housing such as the one made by Ronningen-Petter. FIG. 9 shows the bag filter 74, which includes preferably a 2-inch inlet 100, a 2-inch outlet 102 and a three-quarter-inch drain port 104. Bag filter 74 has a multiple layer design which entraps particles which with a dirt load capacity of 800 grams AC Fine Test Dust and 6,810 grams of oil loading. Bag filter 74 has 38 square feet of media and transports contaminants into each layer of media giving approximately 16 times the capacity of a traditional filter design. Outlet 102 is connected by a pipe to the first micron cartridge filter 75 which preferably filters down to 10 micron with 99.9% efficiency. First micron cartridge filter 75 is in turn connected to second micron cartridge filter 75', which filters down to 5 micron at 99.9% efficiency, and which in turn is connected to a third micron cartridge filter 75" which filters down to 1 micron and is 99.9% efficient.

Also in the preferred embodiment, pressure gauges (not shown) are used to display to the user when the filters are loading and when a filter needs to be replaced. Two gauges are mounted on bag filter 74. It is contemplated that one gauge may be placed between pump 76 and bag filter 74 and another gauge placed between the bag filter 74 and the first micron cartridge filter 75. The filtering system also has a valve on one of the input vacuum lines allowing it to be turned off so the user may attach a regular vacuum hose to the other input line, transforming the filtration system into a super wet/dry vac. Examples of uses of such a system are to suck up debris that fell onto the racks but did not get flushed through the system, and to use the vacuum to clean the inside of a vehicle.

FIG. 10 shows the cleaning system in operation. Fresh water tank 16 is first filled with a liquid using a predetermined amount, such as 150 gallons. Filtering system 14 and pressure washer 18 are plugged into an electrical outlet. Nozzle 26, using the pressure washer 18 to create fluid flow, is used to spray a liquid, preferably water or water with another solvent, to clean a dirty item sitting on the wash racks 12. The liquid drips off the dirty item through the openings of grates 32 of the wash rack 12 and onto the bottom tray 38. The liquid then flows downward along the bottom tray 38, through drainage plate 48 to the trough 40, and down the trough 40, through the trough hole to screen 49, and to the drainage fitting 34. Vacuum pumps 70 suck the liquid through hose 20 from the drainage fittings 34 on the various wash racks 12 to the filtering system 14. Specifically, the liquid is sucked into tank 72 through a baffled intake 106 with a screen which reduces turbulence of the liquid. The separation chamber 82 allows the particulates in the liquid to settle to the bottom. Oil is skimmed from the surface of the liquid using oil skimmer 84. Once the level of the liquid reaches the high-level float switch 90, 60 gallons of liquid are pumped, using pump 76, through the bag filter 74 and subsequently through the series of micron cartridge filters 75, 75', and 75", out of the filtering system 14 and to fresh water tank 16 using hose 22. If a certain level is reached in the elevated fresh water tank 16, some liquid is allowed to drain back to the filtering system 14 for further recycling. This recycling is generally used if an ozone generator is present in the filtering system 14. From the fresh water tank 16, the clean liquid is then pumped to the pressure washer 18 using hose 24. The pressure washer 18 in turn pumps the liquid to nozzle 26 to be used again to wash the dirty item, creating a closed loop.

The above description is considered that of the preferred embodiment only. Modifications of the invention will occur to those skilled in the art and to those who make or use the invention. Therefore, it is understood that the embodiment shown in the drawings and described above is merely for illustrative purposes and not intended to limit the scope of the invention, which is defined by the following claims as interpreted according to the principles of patent law, including the doctrine of equivalents.

The embodiments of the invention in which an exclusive property or privilege is claimed are defined as follows:

We claim:

1. A modular cleaning system comprising:
    at least one modular wash rack, said modular wash rack having a drainage fitting and a coupling means to allow one modular wash rack to be fastened to another modular wash rack;
    a tube connected to said drainage fitting; and
    a filtering system comprising:
        a vacuum pump for pumping a liquid through said tube from said drainage fitting to the filtering system; and
        at least one filter, said at least one filter being operably associated with said vacuum pump.

2. The modular cleaning system of claim 1 wherein said modular wash rack comprises a tray, said tray sloping downward toward said drainage fitting.

3. The modular cleaning system of claim 2 wherein the modular cleaning system further comprises a pressure washer, said pressure washer being connected to and downstream from said filtering system.

4. The modular cleaning system of claim 3 wherein the modular cleaning system comprises a plurality of modular wash racks, each said modular wash rack connected to at least one other modular wash rack by said coupling means.

5. The modular cleaning system of claim 4 wherein said filtering system further comprises a separation chamber.

6. The modular cleaning system of claim 5 wherein each said modular wash rack will hold at least 10,000 pounds of weight without permanently deforming.

7. The modular cleaning system of claim 1 wherein the modular cleaning system further comprises a pressure washer, said pressure washer being connected to and downstream from said filtering system.

8. The modular cleaning system of claim 1 wherein the modular cleaning system comprises a plurality of modular wash racks, each said modular wash rack connected to at least one other modular wash rack by said coupling means.

9. The modular cleaning system of claim 1 wherein said filtering system further comprises a separation chamber.

10. The modular cleaning system of claim 1 wherein each said modular wash rack will hold at least 10,000 pounds of weight without permanently deforming.

11. The modular cleaning system as defined in claim 1 wherein said modular rack further includes:
    a frame having a first wall, a second wall, a third wall, a fourth wall, and a sloped tray, each wall having an inner side and an outer side and said first wall opposite said third wall said drainage fitting being attached to the outer side of said first wall;
    a trough adjacent said first wall, said trough having a bottom, said bottom sloping downward toward said drainage fitting, said sloped tray having its highest point at said third wall and terminating at its lowest point at said trough; and
    a grate positioned over said sloped tray and said trough.

12. A modular cleaning system comprising:
    at least one modular wash rack, said modular wash rack having a drainage fitting and a coupling means to allow one modular wash rack to be fastened to another modular wash rack;
    a tube connected to said drainage fitting;
    a filtering system comprising:
        at least one vacuum pump, said vacuum pump connected to said tube to transport a liquid from said drainage fitting to the filtering system;
        a separation chamber comprising at least one weir;
        a bag filter;
        a plurality of micron cartridge filters;
        said vacuum pump, separation chamber, bag filter and micron cartridge filters being operably associated; and
    a pressure washer, said pressure washer connected to and downstream from the filtering system, said pressure washer having a nozzle for liquid ejection.

13. The modular cleaning system of claim 12 wherein said modular wash rack comprises a tray, said tray sloping downward toward said drainage fitting.

14. The modular cleaning system of claim 12 wherein the modular cleaning system comprises a plurality of modular wash racks, each said modular wash rack connected to at least one other modular wash rack by said coupling means.

15. The modular cleaning system of claim 12 wherein said modular wash rack will hold at least 10,000 pounds of weight without permanently deforming.

16. A modular cleaning system comprising:
    a plurality of modular wash racks, each said modular wash rack comprising a drainage fitting, a coupling means to allow one modular wash rack to be fastened to another modular wash rack, and a sloped tray having its lowest point terminating adjacent said drainage fitting;
    a rubber molding to provide a seal between said modular wash racks;
    a tube, said tube connected to said drainage fitting;

a filtering system comprising:
- a vacuum pump, said vacuum pump connected to said hose to transport a liquid from said drainage fitting to the filtering system;
- a separation chamber comprising at least two weirs;
- at least one filter;
- said vacuum pump, said separation chamber, and said at least one filter being operably associated; and
- a pressure washer, said pressure washer being connected to and downstream from said filtering system.

* * * * *

UNITED STATES PATENT AND TRADEMARK OFFICE
CERTIFICATE OF CORRECTION

PATENT NO. : 6,021, 792
DATED : February 8, 2000
INVENTOR(S) : Matthew J. Petter et al.

It is certified that error appears in the above-identified patent and that said Letters Patent is hereby corrected as shown below:

Column 3, line 47;
  "Lean™" should be -- Lexan™--;

Signed and Sealed this

Sixth Day of March, 2001

*Attest:*

NICHOLAS P. GODICI

*Attesting Officer*    *Acting Director of the United States Patent and Trademark Office*